United States Patent
Kim et al.

(10) Patent No.: US 11,104,300 B2
(45) Date of Patent: Aug. 31, 2021

(54) RADIO FREQUENCY TAG RELAY ATTACK PREVENTION AND NOTIFICATION

(71) Applicant: NIO USA, Inc., San Jose, CA (US)

(72) Inventors: Yongbum Kim, Los Altos Hills, CA (US); Qiyan Wang, Mountain View, CA (US); Jerry L. Petree, San Jose, CA (US); Samir Agrawal, Milpitas, CA (US); Sandeep Dhull, Santa Clara, CA (US); Luna Chen, San Jose, CA (US); Jamie P. Carlson, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/458,926

(22) Filed: Jul. 1, 2019

(65) Prior Publication Data
US 2021/0001806 A1    Jan. 7, 2021

(51) Int. Cl.
*B60R 25/24* (2013.01)
*B60R 25/01* (2013.01)
*B60R 25/20* (2013.01)

(52) U.S. Cl.
CPC .............. *B60R 25/24* (2013.01); *B60R 25/01* (2013.01); *B60R 25/209* (2013.01); *B60R 2325/108* (2013.01); *B60R 2325/205* (2013.01)

(58) Field of Classification Search
CPC ....... B60R 25/24; B60R 25/01; B60R 25/209; B60R 2325/108; B60R 2325/205
See application file for complete search history.

(56) References Cited

U.S. PATENT DOCUMENTS

| | | | |
|---|---|---|---|
| 2015/0015367 A1* | 1/2015 | Lin | B60R 25/20 340/5.63 |
| 2016/0234008 A1* | 8/2016 | Hekstra | G01S 13/751 |
| 2018/0374290 A1* | 12/2018 | Bjorkengren | G07C 9/00174 |
| 2019/0155278 A1* | 5/2019 | Idbrant | E02F 9/205 |
| 2019/0256047 A1* | 8/2019 | Iwashita | G01S 13/08 |
| 2019/0263358 A1* | 8/2019 | Kusumoto | B60R 25/24 |
| 2020/0005566 A1* | 1/2020 | Jain | G01S 13/765 |
| 2020/0039517 A1* | 2/2020 | Berkemeier | G05D 1/0231 |

OTHER PUBLICATIONS

Thevenon et al., "Implementation of a Countermeasure to Relay Attacks for Contactless HF Systems," Chapter 4, InTech, 2013, pp. 67-84.

* cited by examiner

*Primary Examiner* — Nabil H Syed
(74) *Attorney, Agent, or Firm* — Sheridan Ross P.C.

(57) ABSTRACT

Remote devices have replaced keys as a means to access a secure feature of a vehicle. Remote door locks, starters, climate control, trunk openers, etc., have allowed vehicles to be more welcoming and easier to use. However, such functions often rely on radio frequency transmissions that can merely relay signals coming from an authorized device that may allow a nefarious user to access the vehicle or contents therein. By encoding sequence numbers and timestamps within an exchange, a vehicle may determine that an authorized user is too far away to be granted access to the secure feature, thereby denying access to the nefarious user implementing a relay attack on the vehicle.

20 Claims, 10 Drawing Sheets

RADIO FREQUENCY TAG RELAY ATTACK PREVENTION AND NOTIFICATION

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new, they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

Vehicles have implemented convenience devices, such as remote lock/unlock, cabin climate conditioning, and, for fuel-powered vehicles, remote starting. Many now are entirely hands-free and will prepare the vehicle upon a user (having an appropriate transmitting device on their person) approaching the vehicle. Vehicles may turn on lights, unlock doors, set seat position, etc. However, as any new technology is deployed, nefarious actors will seek, and often find, exploitable vulnerabilities in the technology to allow unauthorized access to the vehicle or components or features of the vehicle.

DETAILED DESCRIPTION

Figure 1:
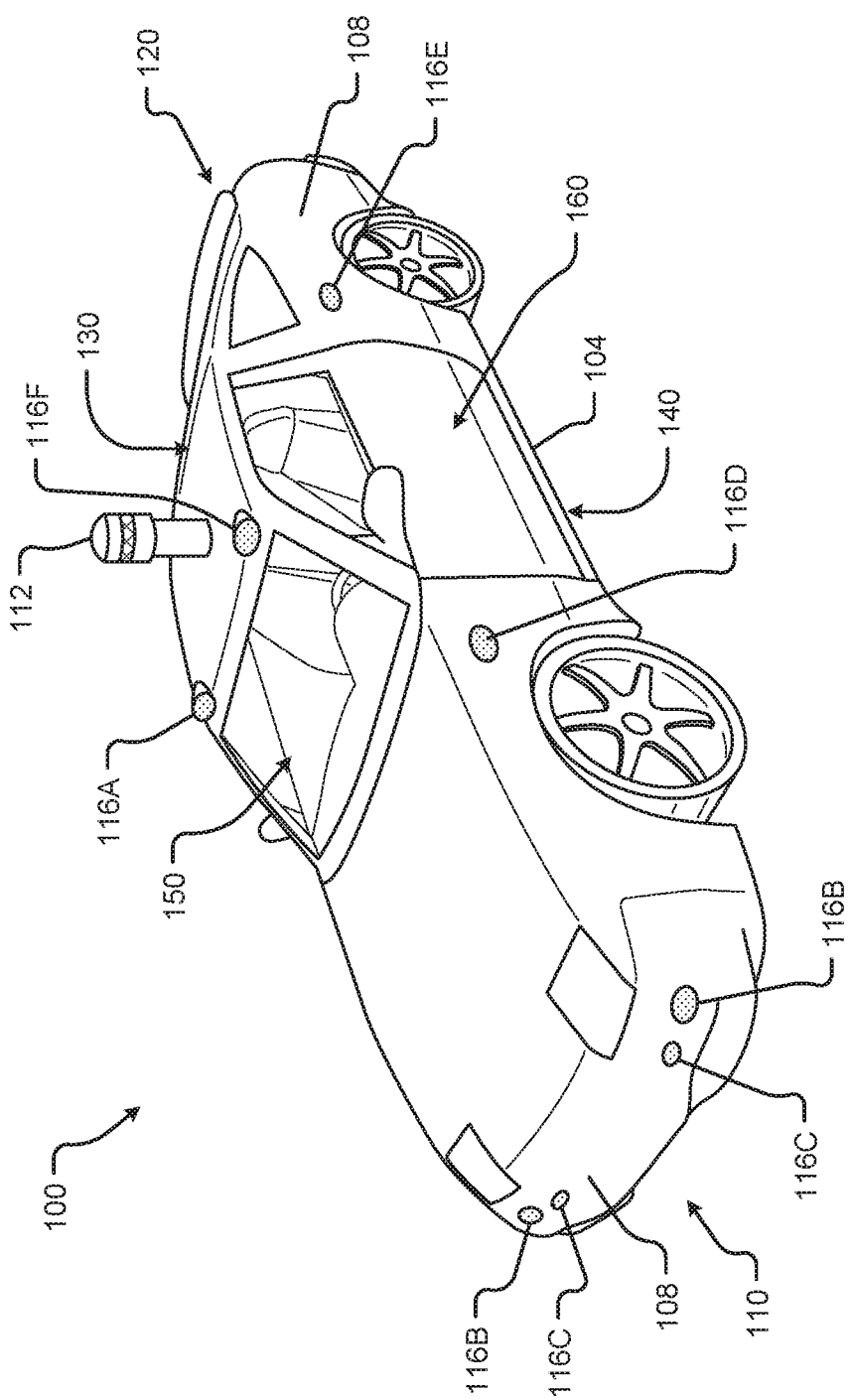
FIG. 1 shows a vehicle in accordance with embodiments of the present disclosure.

Embodiments of the present disclosure will be described in connection with a vehicle, and in some embodiments, an electric vehicle, rechargeable electric vehicle, and/or hybrid-electric vehicle and associated systems. While embodiments are generally directed to a vehicle as embodied as an automobile, it should be appreciated that other vehicle embodiments may be utilized without departing from the scope of the disclosure. In addition to automobiles, examples of other vehicles include, but are not limited to, trucks, vans, motorcycles, scooters, boats, ships, and aircraft. In still other embodiments, certain embodiments herein may be utilized for non-vehicle objects, such as shipping containers, lockers, cabinets, buildings, doors, rooms, etc. to secure the interior and/or contents therein from unauthorized access.

As a general introduction, and in one embodiment, a user carrying a remote device or (e.g., key fob, smart phone, smart watch, or other device enabled to conduct a point-to-point communication with the vehicle) conducts certain automatic communications upon entering communication range, manually initiated communications (e.g., in response to the user pressing a button or triggering a function) while within communication range, and/or being unresponsive to communications (e.g., out of communication range), such as the user exiting the communication range with the vehicle. In response, the vehicle performs operations, such as locking the doors when the user leaves communication range and unlocking the doors when the user enters the communication range. The communication range is selected to be proximate to the vehicle, such as approximately ten meters. This is accomplished by having the communications therebetween utilize one or more particular radio frequency and/or power limitations that natively limit the communication, such as to approximately ten meters. In one embodiment, the user (with remote device) is proximate to the vehicle if they are within communication distance via a near field communication (NFC) distance without utilization of any communication equipment other than the remote device carried by the user and components of the vehicle. The NFC distance being less than thirty meters. In another embodiment, the NFC distance is less than 20 meters. In yet another embodiment, the NFC distance is 10 meters. In certain other embodiments, the NFC distance is closer, such as less than one-half meter and in still other certain embodiments, the NFC distance is even closer, such as less than two centimeters down to physical contact with the vehicle. The NFC distance has the advantage of being operational while the user is proximate to the vehicle and can readily observe the vehicle. However, an attacker may implement a relay attack whereby a reader-transmitter is proximate to the vehicle (or a portion of the vehicle comprising a radio receiver/transmitter) and the signal is forwarded, such as via other wired or wireless technology, to another device.

Attackers may even incorporate the remote device into the attack. For example, another RF transmitter/receiver may be placed proximate to a user carrying the remote device while they perform other activities (e.g., having coffee in a coffee shop). Signals to and from the remote device and vehicle are then relayed by the attacker via a link established between the attacker's transmitter/receiver, which is likely placed proximate to the user and another transmitter/receiver placed proximate to the vehicle. As a result, a nefarious actor may relay the signals to/from the vehicle to gain access to the vehicle or functions of the vehicle.

In order to thwart a potential attack vector, the remote device and/or components of the vehicle monitor and measure the time signals therebetween are sent and, if beyond a threshold time, conclude that the signal is going a greater distance than desired and/or being relayed through additional communication equipment. Accordingly, the communication is not limited to the vehicle and a proximate user and the communication is determined to be unauthorized. An unauthorized communication may be ignored, despite having otherwise valid and actionable content, and/or reported to other components or systems as a potential attack. Additionally or alternatively, the messages exchanged between the vehicle and the remote device may be timestamped such that one or both nodes engaged in the communication can ascertain transmission delays, residency (the time a communication and optionally data processing component(s) require to process an incoming signal, formulate a reply, and begin transmitting the reply), or a combination thereof.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior space 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
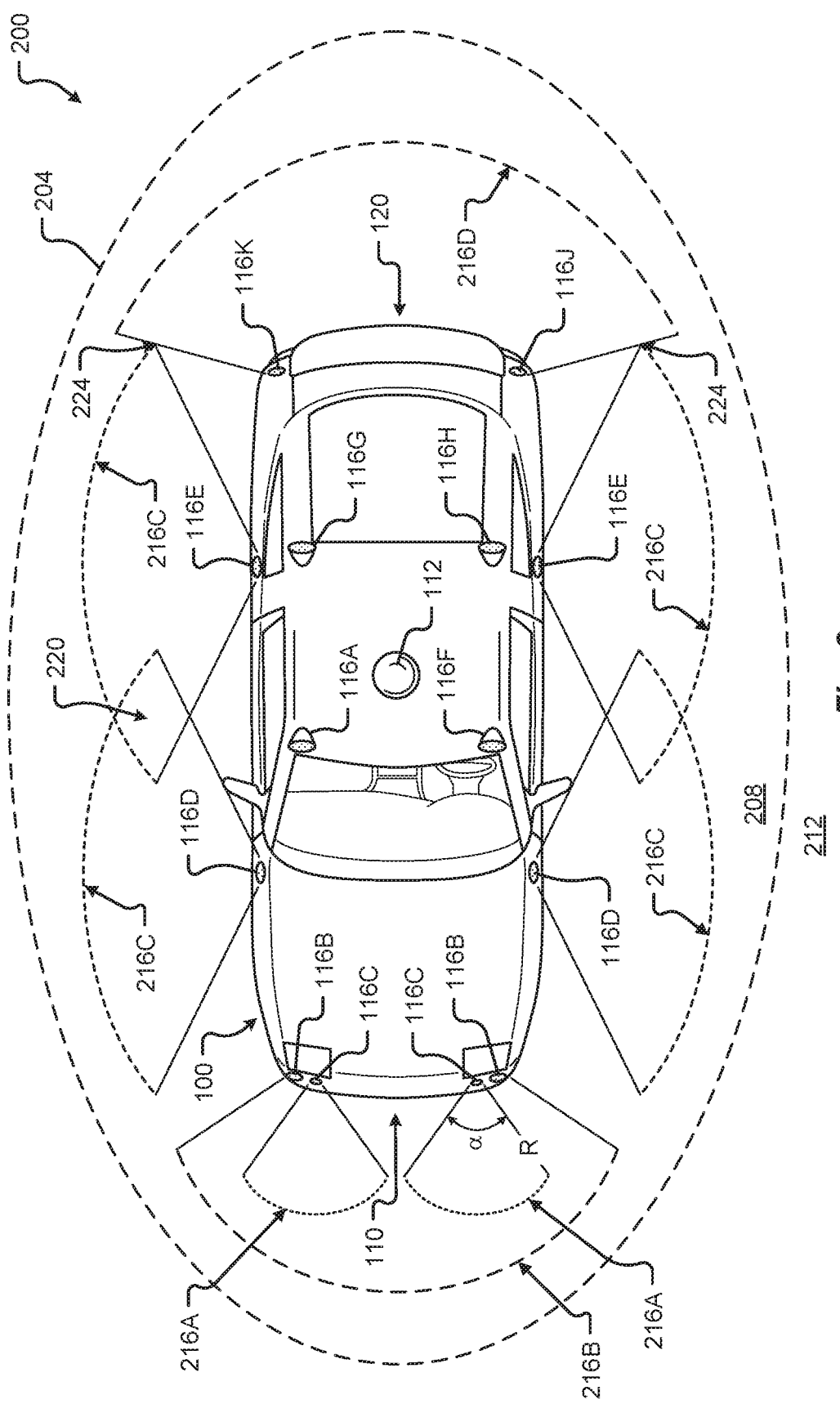
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle α. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle α may define at least one angle of a span, or between horizontal and/or vertical limits, of a sensor 116A-K. As can be appreciated, the operational detection limit and the operational detection angle α of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3:
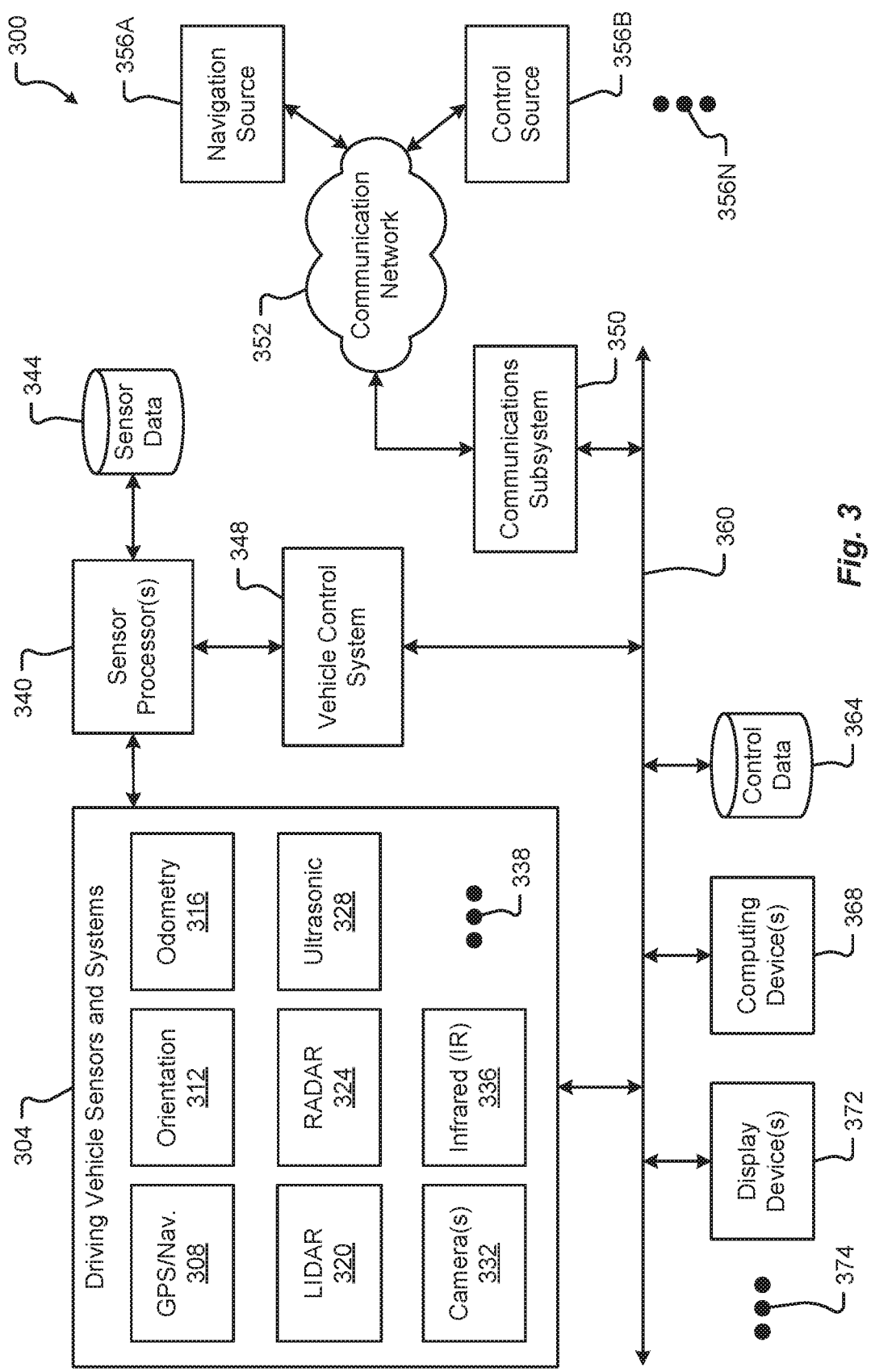
FIG. 3 is a block diagram of an embodiment of a communication environment of the vehicle in accordance with embodiments of the present disclosure.

FIG. 3 is a block diagram of an embodiment of a communication environment 300 of the vehicle 100 in accordance with embodiments of the present disclosure. The communication environment 300 may include one or more vehicle driving vehicle sensors and systems 304, sensor processors 340, sensor data 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

In some embodiments, the driving vehicle sensors and systems 304 may include other sensors 338 and/or combinations of the sensors 308-336 described above. Additionally or alternatively, one or more of the sensors 308-336 described above may include one or more processors configured to process and/or interpret signals detected by the one or more sensors 308-336. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
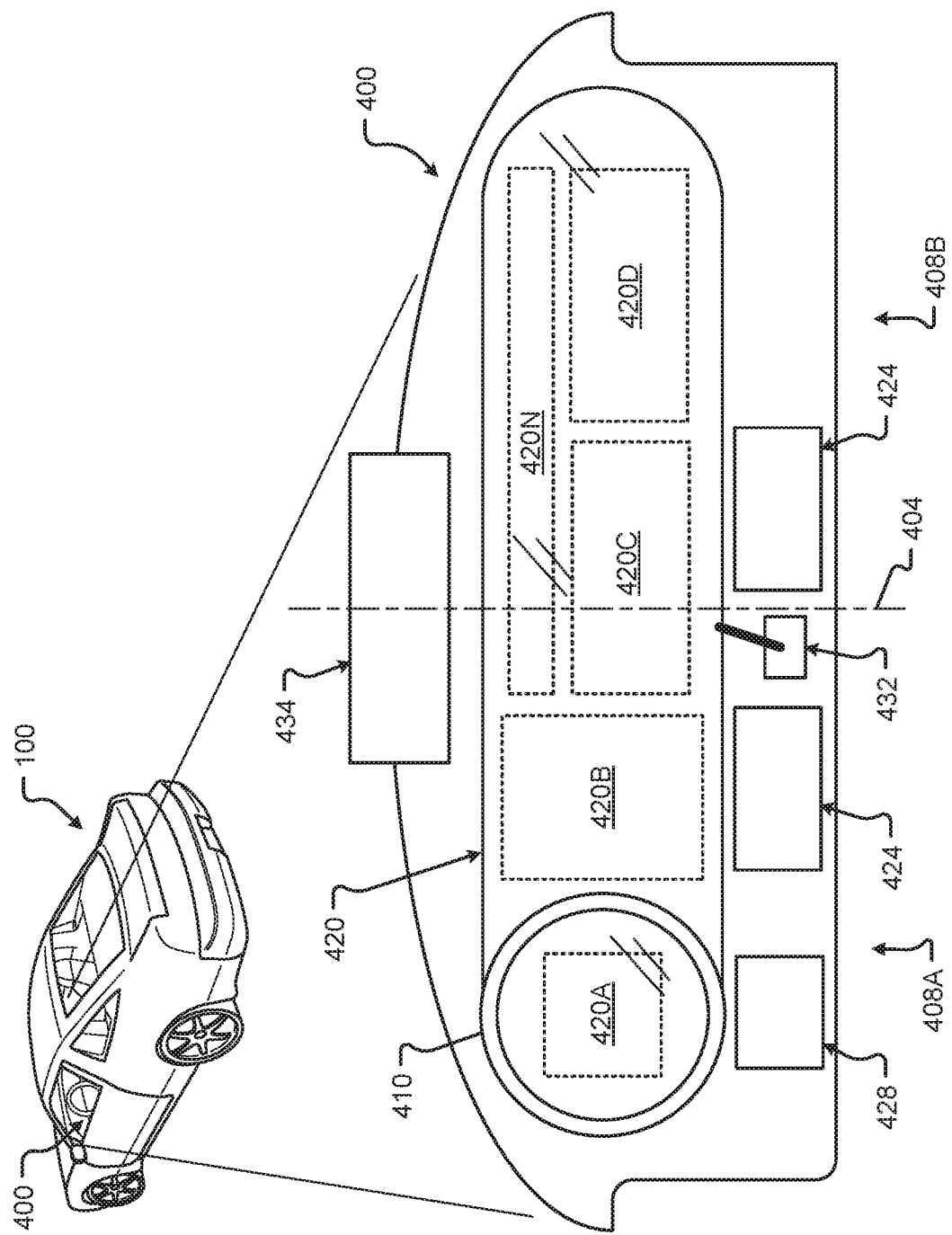
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
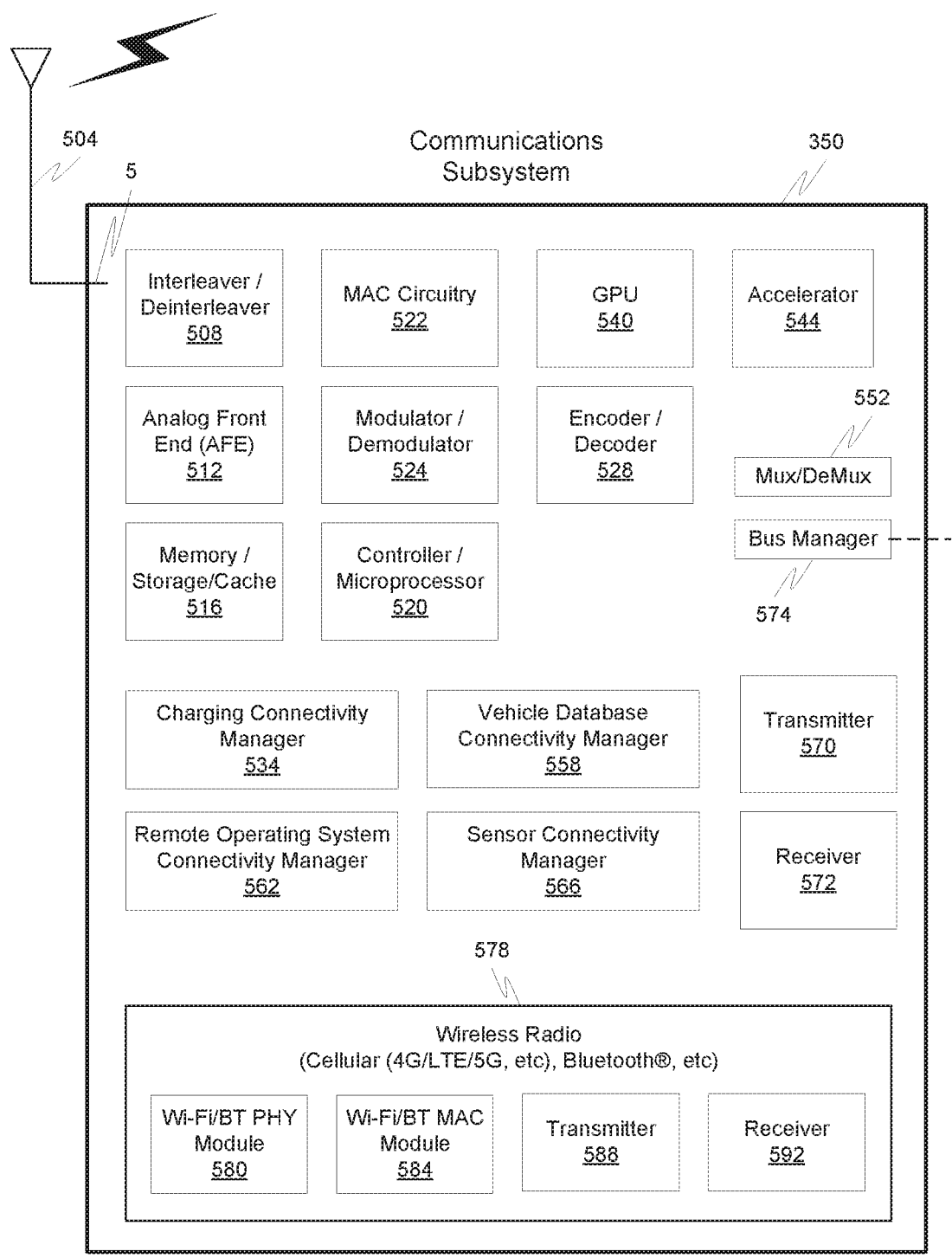
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CAN bus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any if the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and wireless radio 578 components such as a Wi-Fi PHY/Bluetooth® module 580, a Wi-Fi/BT MAC module 584, transmitter 588 and receiver 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter 570 and receiver 572 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE PHY module 580 and a Wi-Fi/BT/BLE MAC module 584 and wireless transmitter 588 and receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 6:
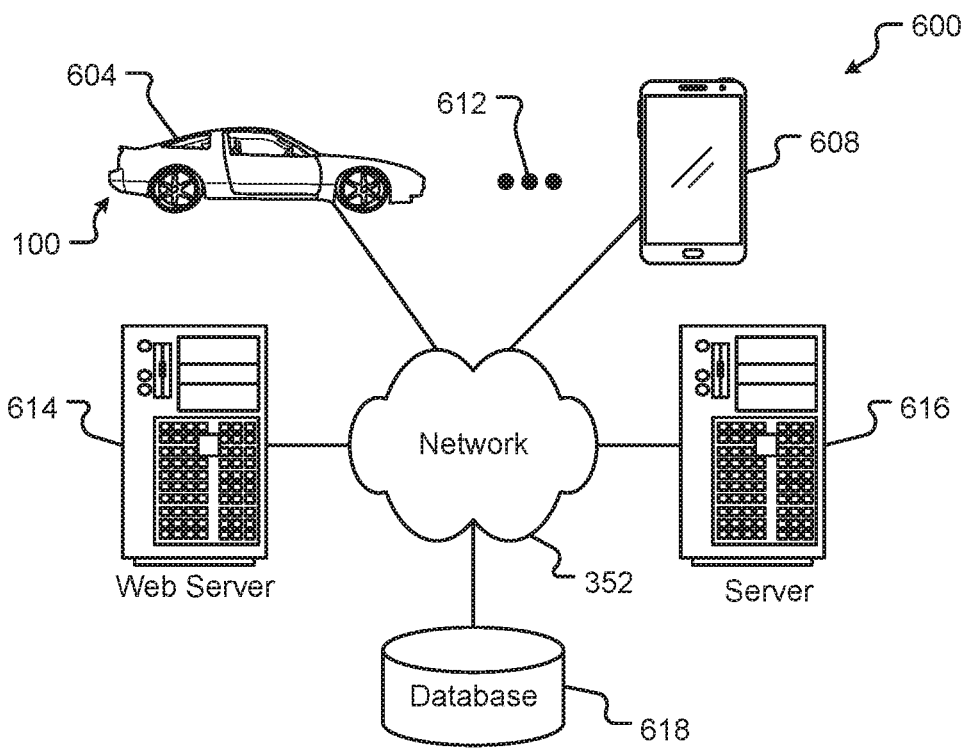
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
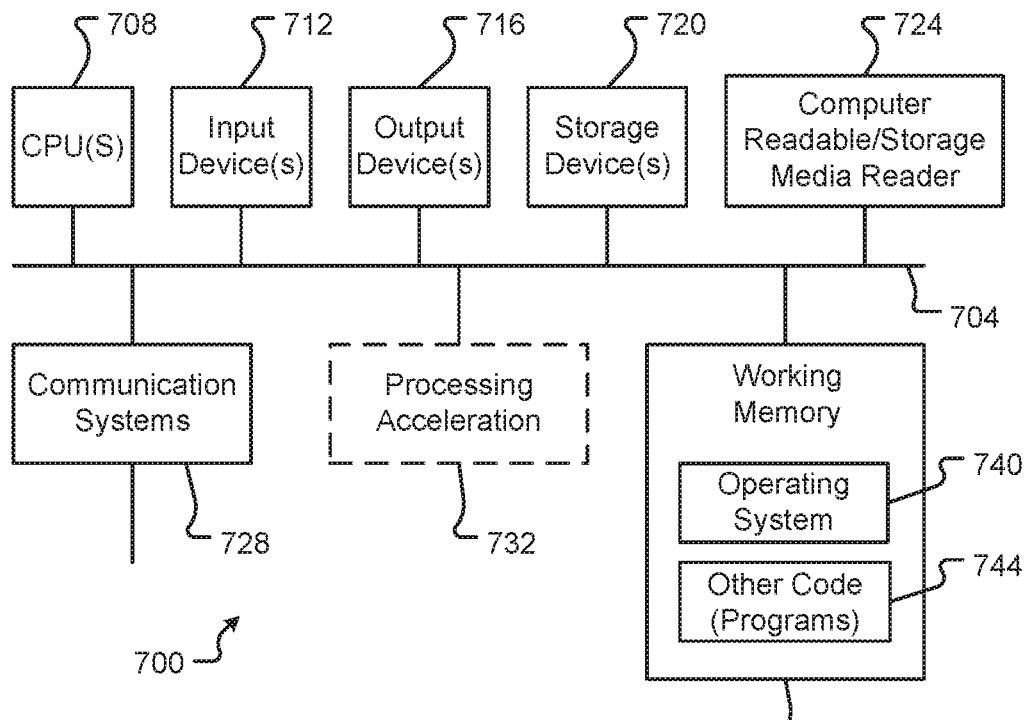
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 8:
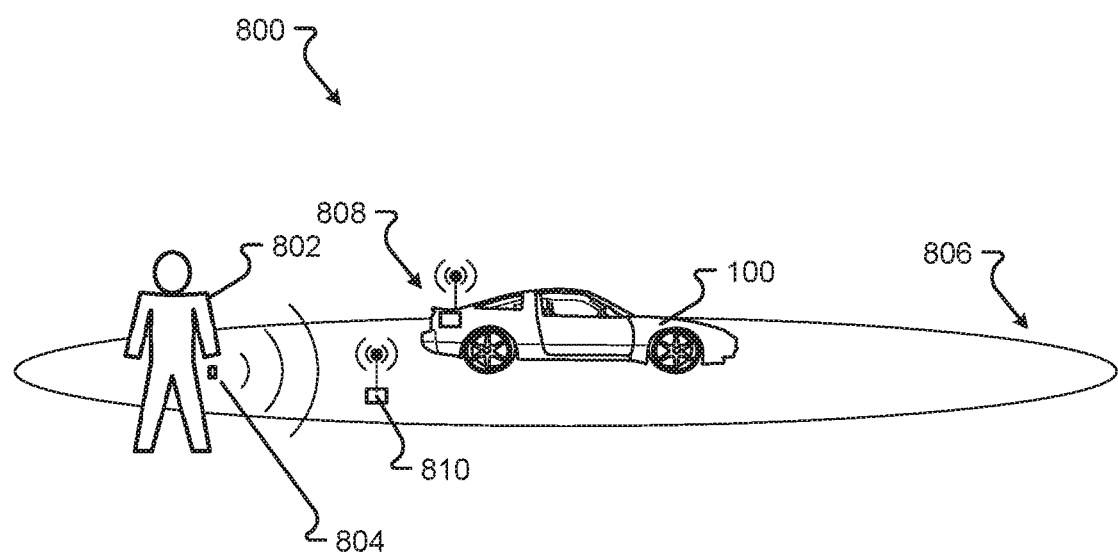
FIG. 8 shows a system in accordance with embodiments of the present disclosure.

FIG. 8 shows system 800 in accordance with embodiments of the present disclosure. In one embodiment, user 802, having remote device 804, is not proximate to vehicle 100 as indicated by being outside of proximity area 806. Vehicle 100 comprises radio frequency component 808 to enable two-way radio frequency communication with remote device 804. In one embodiment, radio frequency component 808 comprises a portion of communications system 350. In another embodiment, remote device 804 is or comprises wireless radio subsystem 578. In yet another embodiment, remote device 804 is or comprises transmitter 588, receiver 592 and at least one processor, such as GPU 540, CPU(S) 708, or a combination thereof. In another embodiment, radio frequency component 808 comprises at least a portion of communication system 728.

Remote device 804 is variously embodied and comprises a radio frequency transmitter/receiver. Remote device 804 may be a single purpose device or comprise other features, including but not limited to features enabled when embodied as a smart phone, key fob, smart watch, and/or other electronic component. Remote device 804 may comprise specific commands, such as to activate or access a secure feature including, but not limited to, lock/unlock the door(s), remote engine start/stop, interior climate preconditioning, open/close door(s), open/close trunk, turn on/off lights, etc.

As described herein, the limits of proximity area 806 are generally associated with line-of-sight when vehicle 100 is parked in a public or semi-public area, such as a parking lot or structure, such as ten meters. While embodiments herein are generally directed to a single proximity area 806, in other embodiments, a plurality of proximity areas may be utilized. For example, a "panic button" associated with remote device 804 may cause vehicle 100 to attract attention (e.g., flash lights, honk horn, etc.) or utilize another communications channel, such as cellular network, to summon police or medical personnel. Such feature may be limited only by the physical limit of the radio frequency communication, so that if a panic signal is detected, vehicle 100 responds accordingly. Other features may be enabled for other differences. For example, another proximity area may be limited to a few meters centered around the rear of vehicle 100, such as a signal to open the trunk (which for the purpose of illustration is assumed to be at the rear of vehicle 100). Similarly, systems to automatically unlock and/or open the door or extending door handles may be energized when the user is proximate to the door, such as within one or two meters. Other functions, such as to precondition the interior climate (e.g., energize the heating or cooling component) may require more time to be effective and be enabled at a greater distance.

Vehicle 100 may comprise one or more secure features. In addition to the secure features described above, vehicle 100 may comprise additional secure features, such as a wireless hotspot for WiFi and/or cellular communications, security features (e.g., motion detectors, cameras, microphones, etc.), vehicle configuration settings, and/or other operations that are intended to be accessible to an authorized user and not accessible to an unauthorized user.

User 802 is illustrated as being outside of proximity area 806. Accordingly, a secure feature would not be accessible to user 802. For example, remote device 804 may be configured to conduct a radio frequency exchange with radio frequency component 808 of vehicle 100 when remote device 804, carried by user 802, approaches vehicle 100 that unlocks the doors to vehicle 100. Radio frequency signals through air travel at approximately ⅔ the speed of light ("c"). By utilizing the well-known function distance=speed*time, it can be known how long a return signal, for user 802 within proximity area 806, should take. However, such an assumption assumes remote device 804 responds instantly, which would be an impossibility. At least some time is spent by remote device 804 determining that an appropriate signal has been received, formulate a response, and transmit a reply. Similarly, if remote device 804 initiates the interaction with radio frequency component 808, radio frequency component 808 would similarly need time to process the response, formulate a reply, and begin transmission of the reply. Additional time may be required for additional processes such as to encrypt/decrypt messages, error correction(s), wake from a low-power or "sleep" mode, or perform any other additional processing. Furthermore, it may be likely that the processors differ from those within remote device 804 and those within vehicle 100, or at least radio frequency component 808. Generally, as remote device 804 is more sensitive to battery life and portability, a processor associated with remote device 804 will likely be inferior in terms of processing speed, memory, etc., to a processor associated with radio frequency component 808, such as CPU(s) 708. As a result of any one or more of the foregoing factors, the round-trip time for a message will take longer than just twice the speed of radio waves through the air. Message sequence numbers (discussed more completely with respect to FIG. 9) may be utilized to better accommodate delays that cannot be determined by distance alone or otherwise comprise an unknown portion.

As a benefit of the foregoing, nefarious device 810 may be configured to execute a "relay attack" whereby signals from radio frequency component 808 are forwarded to remote device 804 and signals from remote device 804 are forwarded to radio frequency component 808. Such attacks are often successful because nefarious device 810 (which may comprise a single device or a plurality having a wired or wireless connection therebetween) merely mimic for one node what they received from the other node with no need to perform any operations, such as encryption/decryption. However, even with the fastest of processors nefarious device 810 cannot improve on the speed of radio waves through air and even if a successful communication is established between radio frequency component 808 and remote device 804, the delay would cause user 802 and/or vehicle 100 to deny access to the secured feature.

Once remote device 804 enters proximity area 806 the distance the radio frequency interaction therebetween traverses takes a length of time that is within a previously determined proximate time and radio frequency component 808 and/or vehicle 100 allows access to the secure feature.

Figure 9:
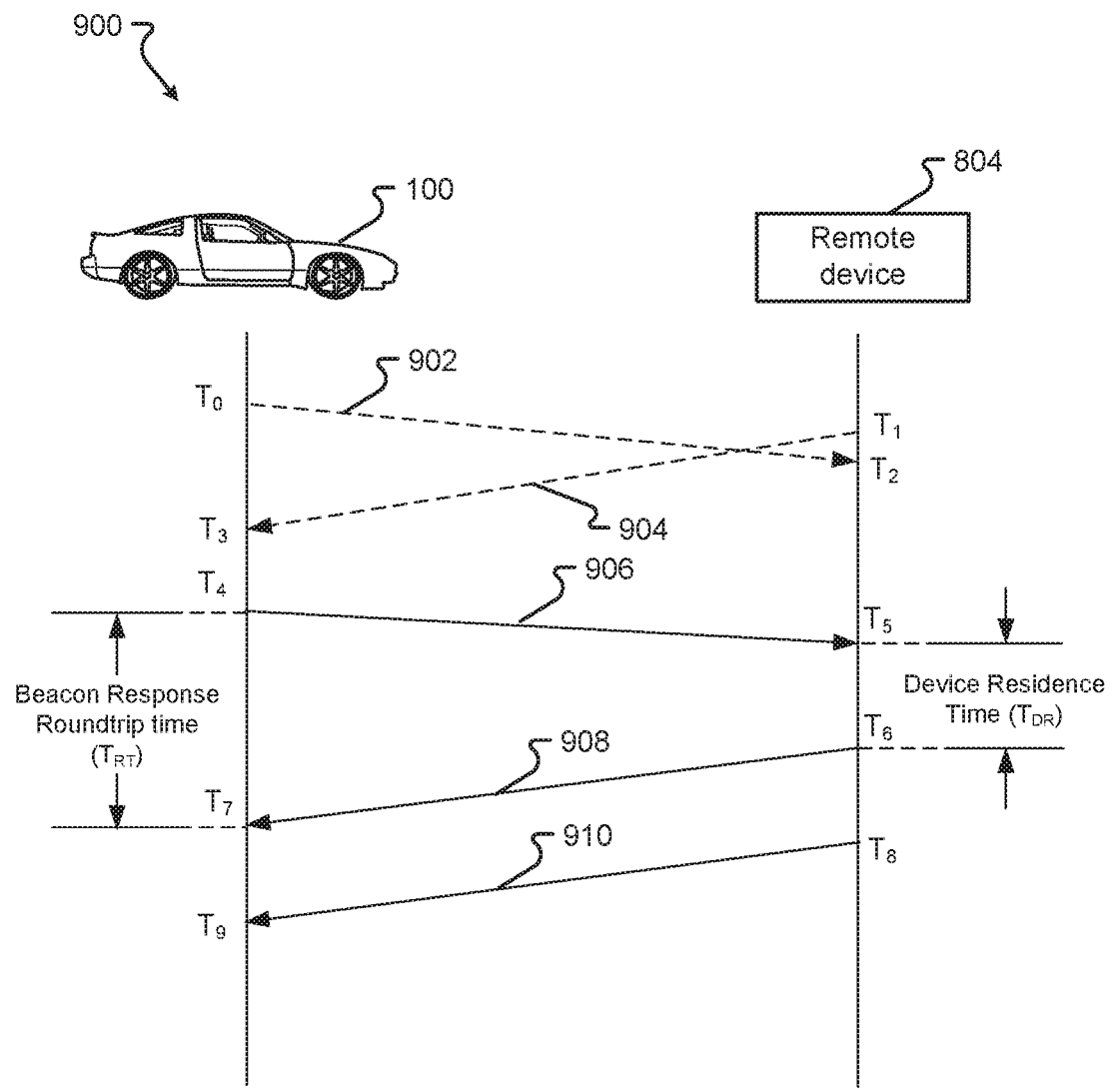
FIG. 9 shows an interaction in accordance with embodiments of the present disclosure.

FIG. 9 shows interaction 900 in accordance with embodiments of the present disclosure. Interaction 900, when successfully completed, may allow a secure feature of vehicle 100 to be enabled. In one embodiment, vehicle 100, directly or via radio frequency component 808, sends first message 902 initiates interaction 900 with remote device 804. In another embodiment, remote device 804 sends second message 904 to vehicle 100 to initiate interaction 900. Only one of first message 902 and second message 904 may be utilized to initiate a particular interaction 900. Additionally or alternatively, if both first message 902 and second message 904 are sent prior to third message 906, then one of first message 902 and second message 904 may be utilized with the other being ignored.

First message 902 may comprise a beacon. A beacon may be one of a series of periodic messages that, if unanswered, are repeated often with a delay between ones of the series. Additionally or alternatively, a beacon (e.g., first message 902) may be sent in response to a trigger event other than time. First message 902 may comprise a message identifier. In one embodiment, the message identifier comprises a sequence number. In another embodiment, the message identifier is a locally unique identifier, such as a pairing code to associate a specific instance of vehicle 100 with a specific instance of remote device 804. For example, vehicle 100 may send first message 902 comprising a message identifier identifying the specific remote device 804 that it is paired to. Additionally or alternatively, the message identifier may identify the sender. The message identifier may be encrypted, in a manner the intended recipient is configured to decrypt, or "in the open," such as when security is provided via other means, such as other encrypted messages. In response to first message 902, remote device 804 make "wake" from a low-power state. An explicit response to first message 902 (not shown) may be provided and first message 902 and/or a response to first message 902 may be encrypted.

Second message 904 may comprise a data service request (DSR), such as to access a specified secure feature. For example, when remote device 804 is embodied as a key fob, user 802 may press a function-specific button (e.g., open trunk). Accordingly, second message 904 may comprise a DSR therein that is encoded with the "open trunk" function request.

In another embodiment, one or more of first message 902, second message 904, third message 906, fourth message 908, and/or fifth message 910 may comprise a header and/or footer with one or more of addressee identifier, sender identifier, interaction protocol identifier, local timestamp, encrypted data payload, function identifier (e.g., 0="toggle door lock", 1="arm alarm system", 2="open trunk", etc.), user identifier, and/or other data element.

Third message 906 may comprise a response to second message 904. Vehicle 100 sends third message 906 and stores the time sent ($T_4$) for subsequent processing. Third message 906 is received by remote device 804 at time ($T_5$) which is the time for one-way travel from vehicle 100 to remote device 804. Remote device 804 then requires time to process received third message 906, such as time to wake (if not already), determining what response should be provided and formatting a response message which may comprise decrypting all or a portion of third message 906 and/or encrypting a response message. At time ($T_6$) the response to third message 906, that is fourth message 908, is sent by remote device 804.

Fourth message 908 is received at vehicle 100 at time ($T_7$). Vehicle 100 can now determine the beacon roundtrip time ($T_{RT}$) as the difference between $T_4$ and $T_7$. Fifth message 910 is also sent from remote device 804 to vehicle 100. Fifth message 910 comprises a device residence time ($T_{DR}$) as the difference between $T_5$ and $T_6$. Fifth message 910, in its entirety or at least the portion comprising $T_{DR}$ (is encrypted, such as utilizing the same encryption (e.g., credentials, keys, etc.) as were utilized in other messages, such as first message 902 and/or third message 906.

Upon receipt of forth message 908, a component of vehicle 100 (such as CPU(s) 708), can determine a distance to the party providing messages, such as will at least one of third message 906, fourth message 908, and fifth message 910 as formula 1:

$$d = \frac{T_{RT} - T_{DR}}{2} \times 0.2 \text{ m/ns} \qquad \text{(Formula 1)}$$

where d is distance;
$T_{RT}$ is beacon roundtrip time; and
$T_{DR}$ is device residence time.

If the distance "d" is less than a previously determined distance, such as a distance determined to be proximate to vehicle 100, access to the secure feature is granted. If d is greater than the previously determined distance, then access is denied. This may override any other criteria, such as successfully completing a cryptographic challenge. Additionally or alternative, an alert may be initiated such as to sound the horn, flash lights, call police, deny all subsequent remote (e.g., radio frequency) access attempts, call/text/email a designated recipient, require secondary authentication (e.g., password, PIN, facial recognition, voice identification, etc.) and/or other alerting action.

In another embodiment the value the calculated distance (d) may be determined with a margin of error, such as due to one or more of beacon transmit time uncertainty (e.g., at $T_4$); beacon timestamp uncertainty (e.g., at $T_5$), such as due to the amount of radio frequency energy required to wake, circuitry wake latency, clock-start latency, and/or other process startup latency; device residence time transmit timestamp uncertainty (e.g., at $T_6$); and/or device residence time receive timestamp uncertainty (e.g., at $T_7$). The foregoing variance from d may be determined as (launch time tolerance*2+receive signal measurement tolerance*2)*0.2 (the approximate speed of radio waves through air in m/ns), wherein launch time tolerance comprises one or more of $T_4$ and $T_5$ and receive signal measurement tolerance of one or more of $T_6$ and $T_7$. Accordingly, the acceptable distance d is the previously determined distance of proximity increased to include any distance tolerance that may be implemented.

Figure 10A:
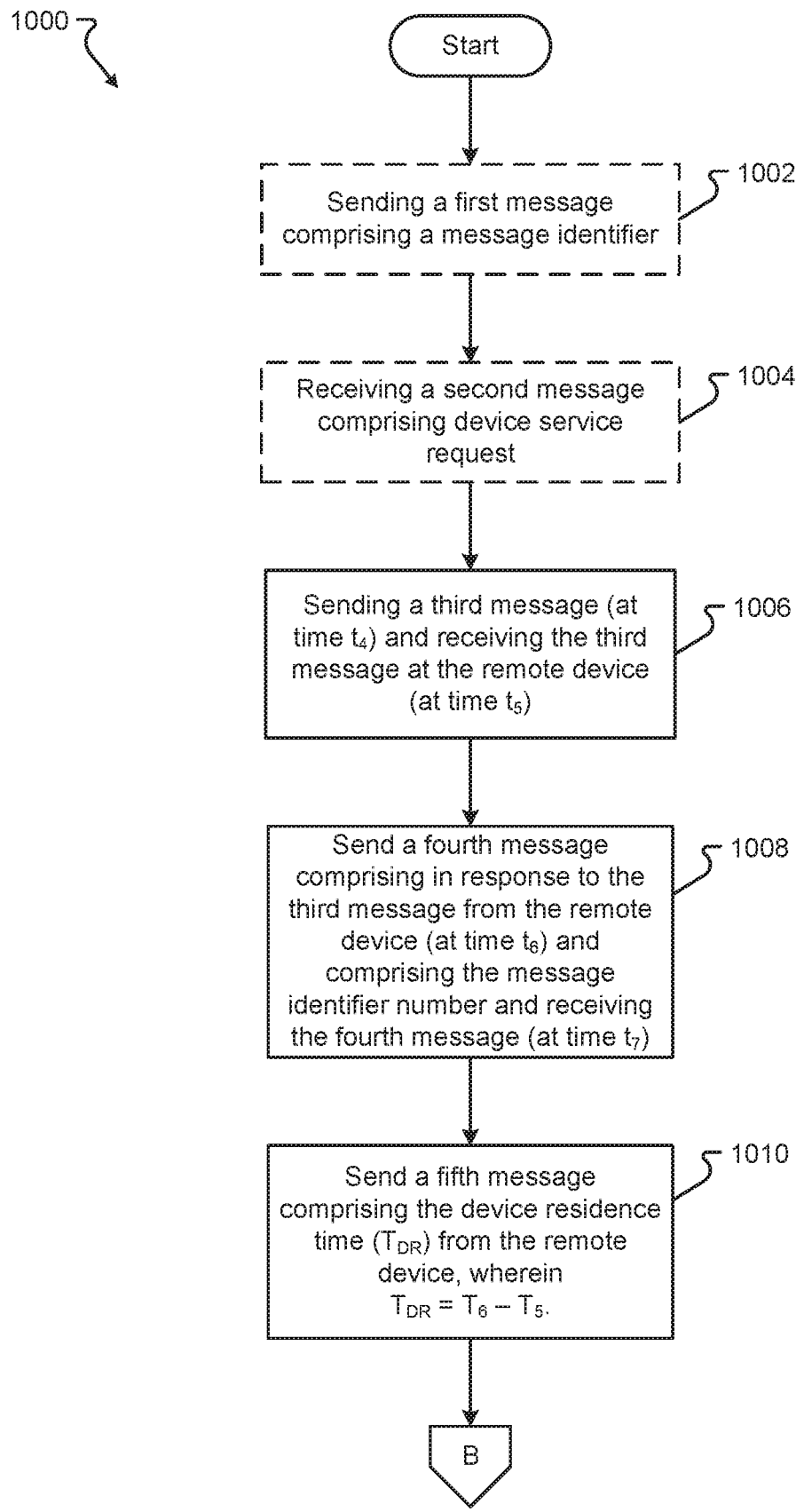
FIGS. 10A and 10B show a process in accordance with embodiments of the present disclosure.
Figure 10B:
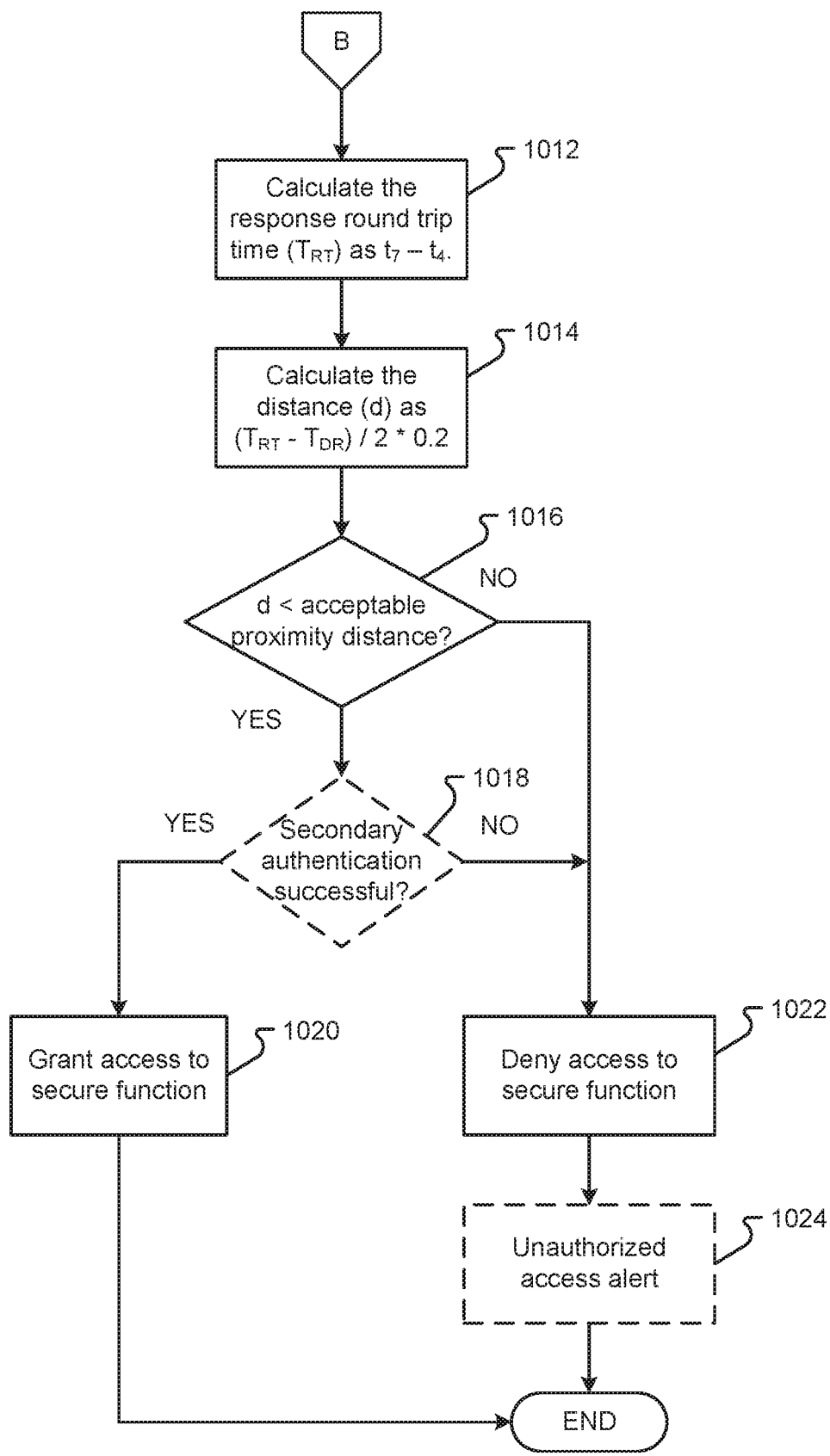

FIGS. 10A-10B illustrate process 1000 in accordance with embodiments of the disclosure. In one embodiment, a first message is sent comprising a message identifier in step 1002. The message identifier is unique to at least vehicle 100 and/or remote device 804. The message identifier may be message sequence number and/or an identification such that the sending one of vehicle 100 or remote device 804 can identify the associated receiving one of vehicle 100 or remote device 804. In another embodiment, a second message is received comprising a device service request at step 1004. In one embodiment, only one of step 1002 or step 1004 is performed. Additionally or alternatively, if both of step 1002 and step 1004 are performed, one of step 1002 or 1004 may be ignored.

In step 1006, a third message is sent at a time $T_4$ and receiving the third message at a remote device at time $T_5$. In step 1008, a fourth message is sent in response to the remote device receiving the third message, the fourth message is sent at time $T_6$. The fourth message comprises the message identifier. Step 1010 sends a fifth message comprising the device residence time determined as the difference between the time the fourth message is sent and the third message is received.

Step 1012 calculates the round-trip time as the difference between the time the fourth message was received and the third message is sent. Step 1014 calculates the distance as one half of the residence time less the device residence time and multiplied by 0.2 meters/millisecond. Optionally, any adjustment factor may be applied, such as to account for a tolerance in the time measuring and/or reporting. Test 1016 determines if the value "d" from step 1014 is less than a previously determined acceptable proximity distance. If test 1016 is determined in the affirmative, processing may continue to step 1018, if implemented. If step 1018 is not implemented, processing may continue to step 1020. If step 1018 is implemented, step 1018 performs any one or more secondary authentications between vehicle 100 and remote device 804. For example, step 1018 may comprise an encrypted exchange, such as via public/private key encryption (e.g., RSA) and/or any other challenge-response. If step 1018 is then determined in the affirmative, processing continues to step 1020. Step 1020 grants access to the secured feature.

If test 1015 is determined in the negative, or when implemented, test 1018 is determined in the negative, step 1022 is executed, such as to deny access to the secure feature. Optionally, step 1024 may also be implemented to further alert a receiving component of the unauthorized access attempt. For example, the horn may honk, lights may flash, a speech message may be played, further radio frequency communications may be denied (for a period of time and/or until a secondary authentication is successfully performed), and/or other operations as may be determined as a matter of design choice.

Steps of process 1000 may be performed by one of a pair of components in radio frequency communication with each other, such as vehicle 100, via radio frequency component 808, and remote device 804. Each of which comprises at least one processor, memory accessible to the processor to maintain computer-readable instructions and/or data for use by the respective processor when executing the computer-readable instructions.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle, comprising: a radio frequency component to receive and transmit messages; a processor in communication with the radio frequency component; and a memory; a secure feature selectively enabled by the processor; and wherein the processor, via the radio frequency component, is operable to conduct an interaction with a remote device; and wherein the processor, upon determining that the interaction is authentic, enables the secure feature, wherein the interaction is determined to be authentic upon determining that the distance between the radio frequency component and the remote device is within a previously determined distance maintained in the memory, and wherein the distance is calculated as half of the difference between a round trip time and the residence time, the difference then being multiplied by the speed of radio waves through air.

Aspects of the above vehicle include:

the vehicle wherein the secure feature is disabled by the processor by default;

the vehicle wherein in response to the determination that the interaction is authentic, the processor enables the secure feature;

the vehicle wherein the round trip time comprises the time one message of the interaction is sent from the vehicle to the time an associated response is received by the vehicle;

the vehicle wherein the residence time comprises the time one message of the interaction is received by the remote device and transmission of an associated response is initiated;

the vehicle wherein a first message of the interaction is associated with a second message of the interaction when the second message of the interaction includes a message sequence number provided by the first message;

the vehicle wherein at least one message of the interaction is cryptographically protected;

the vehicle wherein the interaction comprises: a third message, sent by the radio frequency component in response to receiving the (DSR) and having a third message timestamp indicating that the time the third message was sent; a fourth message, received by the radio frequency component, the fourth message comprising the sequence number and having a fourth message timestamp indicating that the time the fourth message was received; and a fifth message, received by the radio frequency component, comprising sequence number and having a fifth message timestamp indicating that the time that the fifth message was received;

the vehicle wherein the interaction comprises: a first message, sent by the radio frequency component and comprising a sequence number; and a second message, received by the radio frequency component and comprising a device service request (DSR);

the vehicle wherein the interaction comprises: a first message, received by the radio frequency component and comprising a sequence number; and a second message, sent by the radio frequency component and comprising a device service request (DSR);

the vehicle wherein the fourth message comprises a residence time, wherein the residence time is the difference from the time the remote device received the third message and the time the remote device transmits the fourth message; and the vehicle wherein the time the remote device received the third message is corrected to correct a delay cause by a processing component utilized to record the time the third message was received to transition from an idle state to an active processing state.

Embodiments also include a method for authenticating a radio frequency interaction, comprising: conducting, at a radio frequency component associated with a secure feature, the radio frequency interaction between the radio frequency component and a remote device; determining whether the interaction is authentic, upon determining that the interaction is authentic, enabling the secure feature; and wherein the interaction is determined to be authentic upon determining that the distance between the radio frequency component and the remote device is within a previously determined distance maintained a data storage, and wherein the distance is calculated as half of the difference between a round trip time and the residence time, the difference then being multiplied by the speed of radio waves through air.

Aspects of the above method also include:

the method wherein the round trip time comprises the time one message of the interaction is sent from the radio frequency component to the time an associated response is received by the radio frequency component;

the method wherein the residence time comprises the time one message of the interaction is received by the remote device and transmission of an associated response is initiated;

the method wherein a first message of the interaction is associated with a second message of the interaction when the second message of the interaction includes a message sequence number provided by the first message;

wherein the interaction comprises: a first message, sent by the radio frequency component and comprising a sequence number; a second message, received by the radio frequency component and comprising a device service request (DSR); a third message, sent by the radio frequency component in response to receiving the (DSR) and having a third message timestamp indicating that the time the third message was sent; a fourth message, received by the radio frequency component, the fourth message comprising the sequence number and having a fourth message timestamp indicating that the time the fourth message was received; and a fifth message, received by the radio frequency component, comprising sequence number and having a fifth message timestamp indicating that the time that the fifth message was received;

the method wherein the round trip time comprises the difference between a received time of the fourth message and the sent time of the second message;

the method wherein the residence time comprises the difference between the time the third message was received by the radio frequency component and the sending of the fourth message;

Embodiments also include a system comprising: a remote device comprising a radio frequency transmitter-receiver; a radio frequency component to receive and transmit messages and to communicate with the remote device; a processor in communication with the radio frequency component; and a memory; and a secure feature selectively enabled by the processor; and wherein the processor, via the radio frequency component, is conducts an interaction with the remote device; wherein the processor, upon determining that the interaction is authentic, enables the secure feature, wherein the interaction is determined to be authentic upon determining that the distance between the radio frequency component and the remote device is within a previously determined distance maintained in the memory, and wherein the distance is calculated as half of the difference between a round trip time and the residence time, the difference then being multiplied by the speed of radio waves through air; wherein the interaction comprises a first message, sent by the radio frequency component and comprising a sequence number, wherein the interaction comprises a second message, sent by the remote device and comprising a device service request (DSR); wherein the interaction comprises a third message, sent by the radio frequency component in response to receiving the (DSR) and having a third message timestamp indicating that the time the third message was sent; wherein the interaction comprises a fourth message, sent by the remote device, the fourth message comprising the sequence number and having a fourth message timestamp indicating that the time the fourth message was received; wherein the interaction comprises a fifth message, sent by the remote device, comprising sequence number and having a fifth message timestamp indicating that the time that the fifth message was received; wherein the round trip time comprises the difference between a received time of the fourth message and the sent time of the second message; and wherein the residence time comprises the difference between the time the third message was received by the radio frequency component and the sending of the fourth message.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources or may be self-contained with a battery or generator to convert fuel to electricity. An electric vehicle generally includes a rechargeable electricity storage system (RESS) (also called Full Electric Vehicles (FEV)). Power storage methods may include chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle, comprising:
a radio frequency component to receive and transmit messages;
a processor in communication with the radio frequency component; and
a memory;
a secure feature selectively enabled by the processor; and
wherein the processor, via the radio frequency component, conducts an interaction with a remote device;
wherein the processor, upon determining that the interaction is authentic, enables the secure feature, wherein the interaction is determined to be authentic upon determining that a distance between the radio frequency component and the remote device is within a previously determined distance maintained in the memory, and wherein the distance between the radio frequency component and the remote device is calculated as half of a difference between a round trip time and a residence time, the difference then being multiplied by a speed of radio waves through air; and
wherein the interaction comprises:
a first message;
a second message;
a third message, sent by the radio frequency component in response to receiving a device service request (DSR) and having a third message timestamp indicating a time that the third message was sent;
a fourth message, received by the radio frequency component, the fourth message comprising a sequence number and having an associated fourth message timestamp indicating a time that the fourth message was received; and
a fifth message, received by the radio frequency component, comprising the sequence number and having an associated fifth message timestamp indicating a time that the fifth message was received.

2. The vehicle of claim 1, wherein the secure feature is disabled by the processor by default.

3. The vehicle of claim 1, wherein in response to the determination that the interaction is authentic, the processor enables the secure feature.

4. The vehicle of claim 1, wherein the round trip time comprises a time one message of the interaction is sent from the vehicle to a time an associated response is received by the vehicle.

5. The vehicle of claim 1, wherein the residence time comprises a time one message of the interaction is received by the remote device and transmission of an associated response is initiated.

6. The vehicle of claim 1, wherein the first message of the interaction is associated with the second message of the interaction when the second message of the interaction includes the sequence number provided by the first message.

7. The vehicle of claim 1, wherein at least one message of the interaction is cryptographically protected.

8. The vehicle of claim 1, wherein the interaction comprises:
the first message, sent by the radio frequency component and comprising the sequence number; and
the second message received by the radio frequency component and comprising the DSR.

9. The vehicle of claim 1, wherein the interaction comprises:
the first message, received by the radio frequency component and comprising the sequence number; and
the second message sent by the radio frequency component and comprising the DSR.

10. The vehicle of claim 1, wherein the fourth message comprises the residence time, wherein the residence time is the difference from a time the remote device received the third message and a time the remote device transmits the fourth message.

11. The vehicle of claim 10, wherein the time the remote device received the third message is corrected to correct a delay cause by a processing component utilized to record the time the third message was received to transition from an idle state to an active processing state.

12. A method for authenticating a radio frequency interaction, comprising:
conducting, at a radio frequency component associated with a secure feature, the radio frequency interaction between the radio frequency component and a remote device;
determining whether the radio frequency interaction is authentic,
upon determining that the radio frequency interaction is authentic, enabling the secure feature; and
wherein the radio frequency interaction is determined to be authentic upon determining that a distance between the radio frequency component and the remote device is within a previously determined distance maintained in a data storage, and wherein the distance between the radio frequency component and the remote device is calculated as half of a difference between a round trip time and a residence time, the difference then being multiplied by a speed of radio waves through air; and
wherein the radio frequency interaction comprises:
a first message;
a second message;
a third message, sent by the radio frequency component in response to receiving a device service request (DSR) and having a third message timestamp indicating a time that the third message was sent;
a fourth message, received by the radio frequency component, the fourth message comprising a sequence number and having an associated fourth message timestamp indicating a time that the fourth message was received; and
a fifth message, received by the radio frequency component, comprising the sequence number and having an associated fifth message timestamp indicating a time that the fifth message was received.

13. The method of claim 12, wherein the round trip time comprises a time one message of the radio frequency interaction is sent from the radio frequency component to a time an associated response is received by the radio frequency component.

14. The method of claim 12, wherein the residence time comprises a time one message of the radio frequency interaction is received by the remote device and transmission of an associated response is initiated.

15. The method of claim 12, wherein the first message of the radio frequency interaction is associated with the second message of the radio frequency interaction when the second message of the radio frequency interaction includes the sequence number provided by the first message.

16. The method of claim 12, wherein the round trip time comprises the difference between a received time of the fourth message and a sent time of the second message.

17. The method of claim 12, wherein the residence time comprises the difference between the time the third message was sent by the radio frequency component and the receiving of the fourth message.

18. A system comprising:
a remote device comprising a radio frequency transmitter-receiver;
a radio frequency component to receive and transmit messages and to communicate with the remote device;
a processor in communication with the radio frequency component; and
a memory; and
a secure feature selectively enabled by the processor; and
wherein the processor, via the radio frequency component, is operable to conduct an interaction with the remote device;
wherein the processor, upon determining that the interaction is authentic, enables the secure feature, wherein the interaction is determined to be authentic upon determining that a distance between the radio frequency component and the remote device is within a previously determined distance maintained in the memory, and wherein the distance between the radio frequency component and the remote device is calculated as half of a difference between a round trip time and a residence time, the difference then being multiplied by a speed of radio waves through air;
wherein the interaction comprises a first message, sent by the radio frequency component and comprising a sequence number,
wherein the interaction comprises a second message, sent by the remote device and comprising a device service request (DSR);
wherein the interaction comprises a third message, sent by the radio frequency component in response to receiving the DSR and having a third message timestamp indicating a time that the third message was sent;
wherein the interaction comprises a fourth message, sent by the remote device, the fourth message comprising the sequence number and having an associated fourth message timestamp indicating a time that the fourth message was received;
wherein the interaction comprises a fifth message, sent by the remote device, comprising the sequence number and having an associated fifth message timestamp indicating a time the fifth message was received;
wherein the round trip time comprises the difference between a received time of the fourth message and the time that the third message was sent; and
wherein the residence time comprises the difference between the time that the third message was sent by the radio frequency component and the receiving of the fourth message.

19. The method of claim 12, wherein at least one message of the radio frequency interaction is cryptographically protected.

20. The system of claim 18, wherein at least one message of the interaction is cryptographically protected.

* * * * *

UNITED STATES PATENT AND TRADEMARK OFFICE
CERTIFICATE OF CORRECTION

| | | |
|---|---|---|
| PATENT NO. | : 11,104,300 B2 | Page 1 of 1 |
| APPLICATION NO. | : 16/458926 | |
| DATED | : August 31, 2021 | |
| INVENTOR(S) | : Yongbum Kim et al. | |

It is certified that error appears in the above-identified patent and that said Letters Patent is hereby corrected as shown below:

In the Claims

Claim 10, Column 31, Line 19, delete "and a time" and insert --and the time-- therein.
Claim 18, Column 32, Line 57, after "time" insert --that-- therein.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*